United States Patent [19]
Triplett

[11] Patent Number: 6,000,831
[45] Date of Patent: Dec. 14, 1999

[54] INJECTION MOLD DATA TRANSMISSION SYSTEM

[75] Inventor: Timothy Triplett, Thousand Oaks, Calif.

[73] Assignee: American MSI Corporation, Moorpark, Calif.

[21] Appl. No.: 08/798,831

[22] Filed: Feb. 12, 1997

[51] Int. Cl.$^6$ .......................... B29C 39/00; B29C 45/00; B29C 7/04; B29B 7/00

[52] U.S. Cl. ................................ 364/475.09; 364/475.02; 364/475.05; 364/475.07; 364/475.08; 364/475.1; 425/137; 425/143; 264/40.3; 264/40.6; 264/328.1; 264/328.14

[58] Field of Search .................... 364/475.01, 475.02, 364/475.05, 475.06, 475.07, 475.08, 475.09, 475.1; 264/40.1, 40.4, 40.5, 40.6, 328.1, 328.14, 328.4, 328.18; 425/135, 143, 144–146

[56] References Cited

U.S. PATENT DOCUMENTS

| | | | |
|---|---|---|---|
| 4,826,418 | 5/1989 | Kamiguchi | 425/136 |
| 4,899,288 | 2/1990 | Tsutsumi | 364/476 |
| 5,316,707 | 5/1994 | Stanciu et al. | 264/40.1 |
| 5,456,870 | 10/1995 | Bulgrin | 264/40.6 |

Primary Examiner—Reba I. Elmore
Assistant Examiner—Nayin Natnithithadha
Attorney, Agent, or Firm—Fulwider Patton Lee Utecht, LLP

[57] ABSTRACT

The present invention relates to injection mold hot runner control devices and more particularly to an injection molding control device which eliminates the conventional control cables to improve the quality of feedback signals received by the controller and the safety of the environment in which such systems are used. The present invention utilizes a signal processor to convert analog signals received from the mold temperature sensors into a digital feedback signal in the vicinity of the mold and to transmit such feedback signal to a receiver connected to a controller at a location remote from the mold. The mold controller processes the feedback signal and generates a corresponding control signal. The control signal is transmitted from the remotely located controller to the controlled device, typically the mold heaters. A single controller and a single mold signal processor may be used to be able to control numerous molds by utilizing signals on different lines or frequencies or in other means of signal differentiation known to those skilled in the art. The system of the present invention enables the injection mold user to eliminate the numerous problems, difficulties and repair costs of the prior art as well as enabling the user to gain an improved feedback loop that was not feasible under control systems of the prior art.

17 Claims, 2 Drawing Sheets

INJECTION MOLD DATA TRANSMISSION SYSTEM

BACKGROUND OF THE INVENTION

The present invention relates to injection molding apparatus and procedures and more particularly to a structure and method for enabling and facilitating the transmission of information from injection mold sensors to a control device without the use of cumbersome and expensive analog hard-wired connections. The present invention also provides increased reliability in the feedback control loop as it enables the user to eliminate numerous junctions which can introduce errors into the control system.

Injection molding is typically done in molds which operate at high temperatures and high pressures within the molds. Typical molds include means to heat the molds at numerous points within the mold in order to ensure that the material injected into the mold remains in a molten state until the mold cavity is completely filled and that no voids exist within the cavity (i.e. hot runner system) as is known to those skilled in the art. In addition, as is known to those skilled in the art, it can be desirable to heat a mold, prior to injecting material therein, in order to control the rate at which the material cools and hardens in order to effect the material properties of the molded product (e.g. material strength, etc.)

In order to effect such control, it is necessary to provide a closed-loop feedback system between the controlled device (e.g., a mold heater) and the mold sensor (e.g., a mold temperature sensor), through a controller of some sort which can utilize the information from the mold sensor and control the controlled device in accordance with a predetermined set of instructions. Currently, information from injection mold sensors is transmitted to a controller in analog form via a hard-wired connection which utilizes sensor specific wires which are physically connected to the sensors and the control device through a series of connectors. These wires, used with readily available connectors, create sensor feedback cables. Each cable typically requires two or more wires per sensor located in the mold to transfer an analog signal.

The number of cables required to transfer the information as applied to, for example, temperature in thermal analog form, from the mold to the control device, is dependent on the number of sensor devices located in the mold, but often times exceeds 48 wires for a typical commercial mold configuration. For example, if a mold requires 30 sensor devices, 60 analog sensor wires would typically be required. In addition, each of the sensor wires is typically arranged such that there are 7 thermal junction points between the sensor device and the control device for each sensor wire. Accordingly, in an injection mold such as the one described above, there would be 420 connections created between the sensor devices in the identified mold and the control device for that mold.

Closed-loop feedback systems such as those described above with numerous wires and connectors can create various problems known to those skilled in the art, including: 1) problems associated with bad connections and cold solder joints which may feedback faulty or intermittent data; 2) inaccurate feedback due to temperature variations along the path of the analog feedback cable; 3) the effects of electrical noise on low level analog signals over the span of the feedback cable; 4) numerous problems caused by the sheer volume of cables and wires required, including problems as simple as storage of the wires and cables, and people tripping over cables located on the floor of the injection mold area; and 5) other problems known to those skilled in the art. As the number of sensors in a given mold increases, so too does the number of wires and connections in a conventional system. Thus, as the mold becomes more intricate or sophisticated and control of the operation of the mold becomes more critical, the chance for induced error in a conventional control system similarly increases. Indeed, one practical limitation on the number of temperature sensors which can be effectively employed in injection molding systems results from the limitation on the number of sensor and control wires which a system and system operator can manage.

SUMMARY OF THE INVENTION

The preferred embodiment of the present invention provides for sensor input circuitry to be positioned within a thermally isolated enclosure attached to the mold or positioned in the vicinity of the mold. A signal processor, which in the preferred embodiment of the present invention converts analog sensor signals from the sensors into a digital format is also provided. In addition, the present invention includes a communicator positioned within the thermally isolated enclosure to transmit information from the mold temperature sensors, once it has been converted to digital format, to the mold controller and a receiver positioned in or in the proximity of the mold controller to receive said digital information transmitted to the mold controller from the communicator so as to permit the closed-loop control of the molding apparatus.

The advantage of the invention is that, unlike the system of the prior art which required numerous analog connections and the concomitant problems associated therewith, the present invention allows the transmission of signals from the. sensor input circuitry to the mold controller to be accomplished by digital means, thereby eliminating numerous analog connections and the associated problems therewith. This digital interface eliminates all but one of the analog connections, thereby almost entirely eliminating the possibility of junction induced error. In addition, because the information is preferably converted to digital form within a thermally isolated enclosure located on the proximity of the mold itself and transmitted in such form to the control device, the possibility of electrical noise effecting an analog control signal is also greatly reduced. Furthermore, many advantages are created through the elimination of the numerous cables required by the prior art, including: 1) reduced replacement costs for the numerous wires; 2) reduction in cable connection errors; 3) energy and space savings due to the elimination of the need to transport and store the vast number of wires and cables required under the prior art; 4) elimination of the safety hazard created when low level analog signals run next to high power output cables, which may be mistakenly connected to the wrong device and cause damage, fire or electrocution; and 5) elimination of the safety hazard created when numerous wires and cables are run along the floor of the area in which the injection mold is positioned.

DESCRIPTION OF THE FIGURES

The present invention will be described more fully in reference to the accompanying drawings, wherein.

DETAILED DESCRIPTION OF THE PREFERRED EMBODIMENTS

Figure 1:
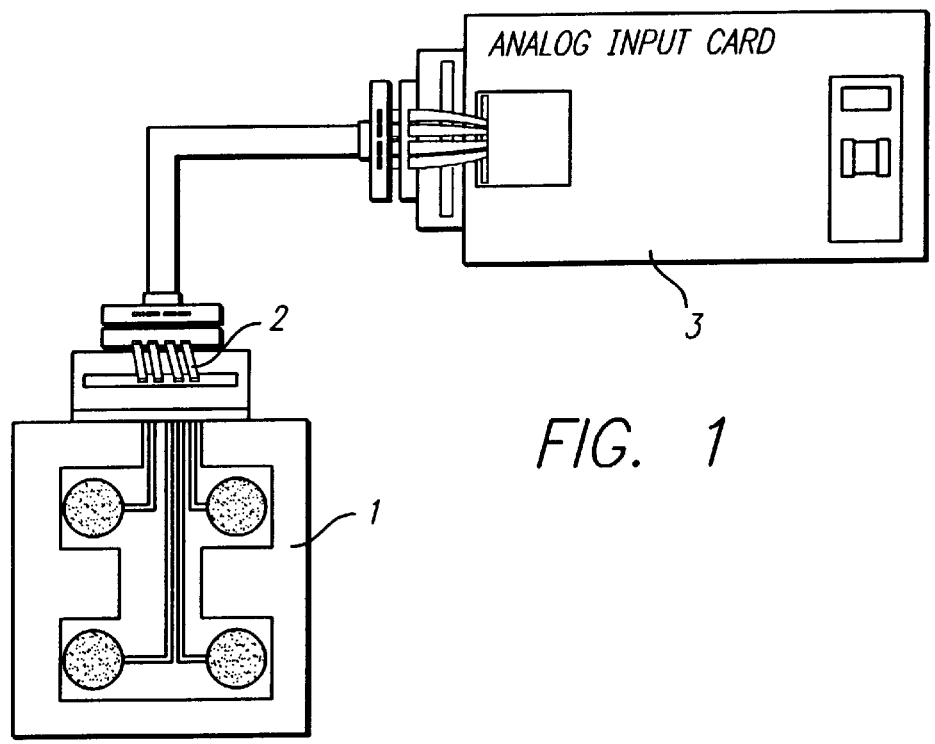
FIG. 1 is an illustrative prospective view of a typical mold and associated control device utilizing a system of the prior art.

As is illustrated in FIG. 1, the system of the prior art provides for an injection molding system 1 to have a number of wires 2 running from the mold 1 to the mold controller 3. These wires carry analog information from the mold to the controller and commands or switched electrical power from the controller to the controlled elements associated with the mold. The mold controller must be located away from the mold due to its physical size and due to the environment in which a mold operates, namely an environment in which the mechanical operation of the mold/machine requires it to be suitably secure from any human contact during operations associated with typical injection molding processes. The controlled elements associated with the mold can be mold heaters arranged to heat the mold or the material injected therein (i.e., thermal elements), or valve pistons or the like arranged to create positive opening and closing of the gate within the mold for use in the injection molding process as known to those skilled in the art (i.e., valve gates) and mold/material pressure sensing devices known as cavity pressure sensors.

Figure 3:
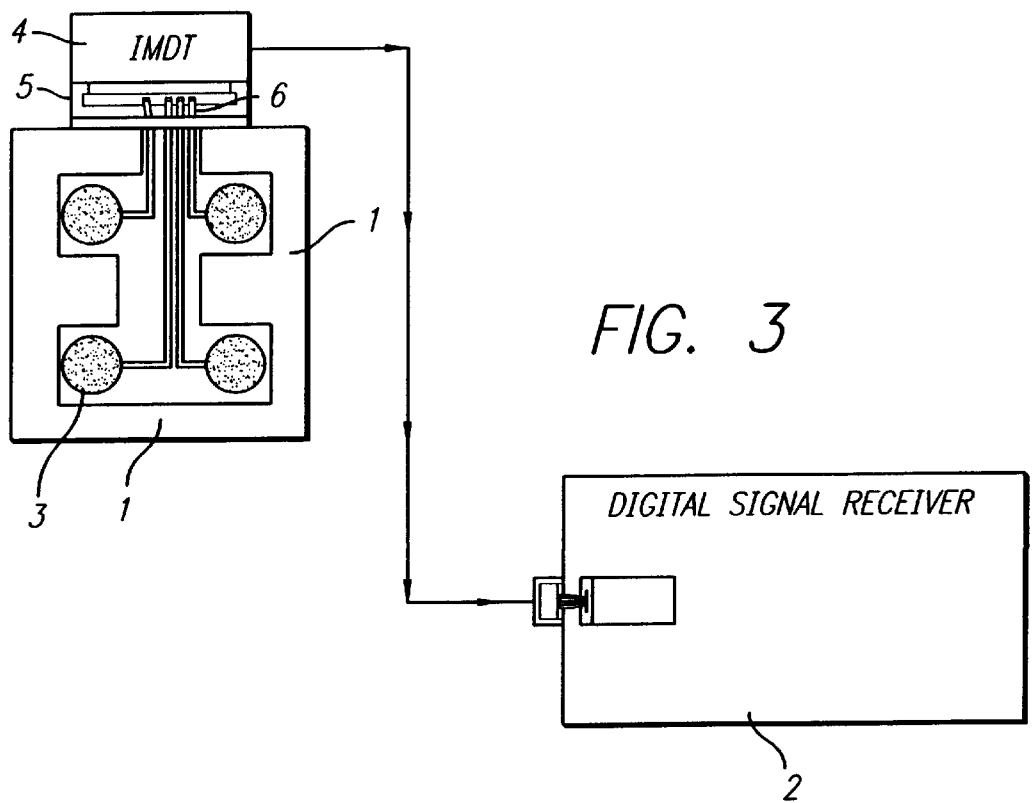

As is illustrated in FIG. 3, the system of the present invention includes: 1) a mold 1; and 2) a mold controller for receiving and processing information received from the mold as well as for generating control signals for transmission to one or more controlled elements associated with the mold. Sensors 3 are placed at desired locations on, in or around the mold. Such sensors can be directed to sensing information about the temperature, the pressure, the flow or any other variable which the operator wishes to monitor or measure. A temperature sensor input device typically consists of a bi-metallic thermocouple of the type known in the art which generates an analog signal from which a temperature can be determined. Similar sensor elements relating to pressure and other variables are known to those skilled in the art.

In the preferred embodiment of the present invention, the thermally isolated enclosure 4 is coupled 5 to the mold or to a holding structure in the vicinity of the mold. The thermally isolated enclosure can be constructed from a plastic or metallic material with a thermally nontransmissive material attached between the enclosure and the mold itself.

Arranged within the thermal enclosure are a junction box 6 which houses the interface connections between the mold sensors and the IMDT thermal enclosure. The IMDT thermal enclosure houses electrical and electronic components that include, a signal processor, a transmitter and a power supply. The junction box is arranged to provide a place to simply connect the wires from the mold sensor devices to the IMDT device. The junction box is detachable from the thermal enclosure to facilitate quick replacement of faulty components.

Figure 2:
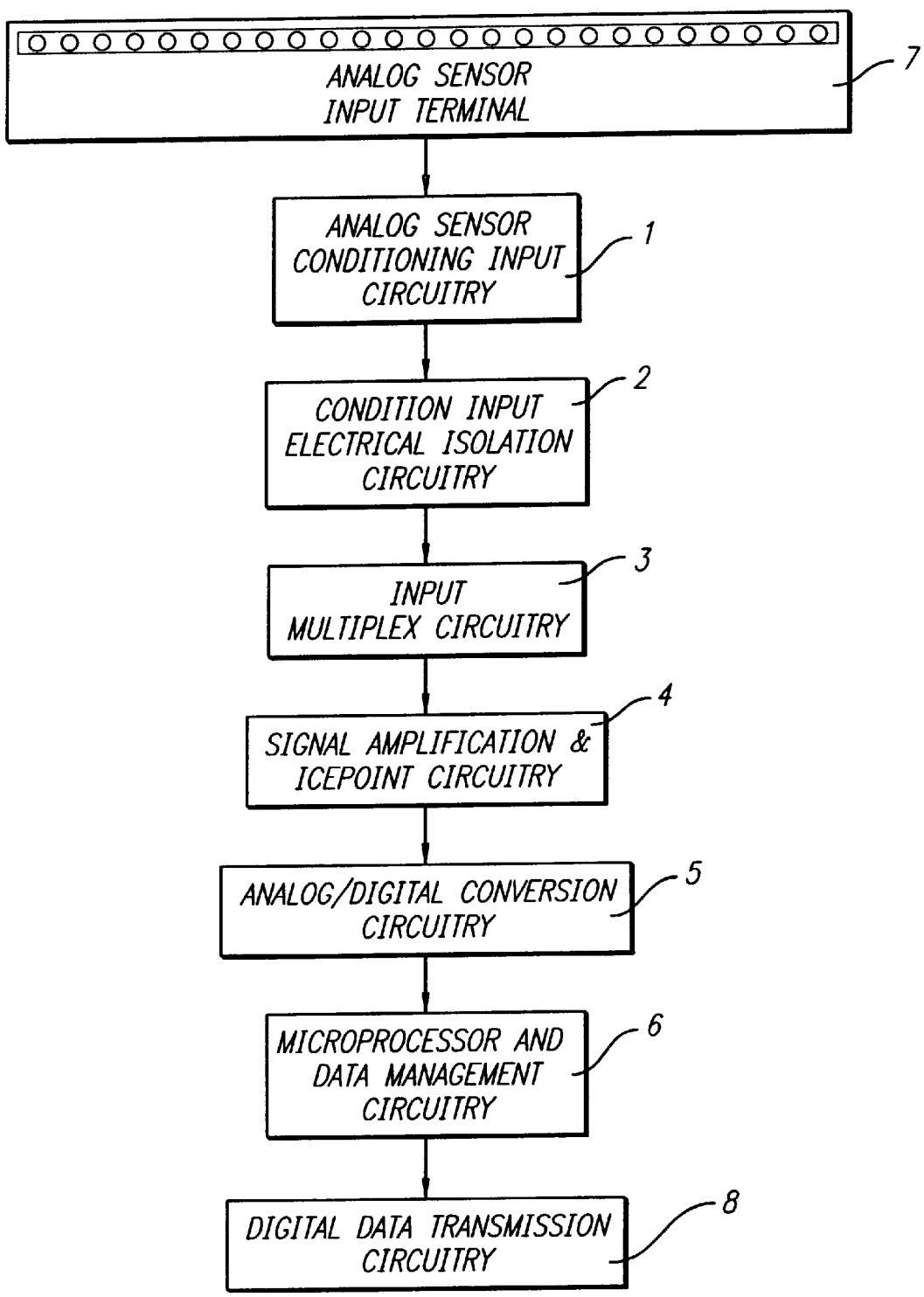
FIG. 2 is a schematic block diagram of the preferred embodiment of the system of the present invention; and, FIG. 3 is an illustrative prospective view of a typical mold and associated control device utilizing a system incorporating the present invention.

As illustrated in FIG. 2, the signal processor of the preferred embodiment includes a sensor conditioning input circuit, an isolation circuit 1, a multiplexer 3, an amplifier 4, a microprocessor 6, and an analog to digital converter 5 as well as the closed loop return logic from the control device. The sensor conditioning input circuit 1 is connected to the IMDT input devices 7, and serves to amplify the signals and filter noise from the analog inputs. The isolation circuit 2 is connected between the micro-processor 6 and the analog digital converter 5, the isolation circuit acts to optically isolate the signal conditioning and conversion circuitry from the logic of the micro-processor. A multiplexer 3 is coupled to said analog digital circuitry 5 and conditioned inputs. The resulting signals output from said multiplexer, are transmitted to an analog to digital converter 5 of a conventional design. The resulting digital signal is transmitted to a microprocessor 6 via optically isolated circuits for further signal processing within the micro-processor. The input of the transmitter 8 is coupled to said microprocessor 6 for transmission to the receiver connected to the mold controller. While described in reference to the above identified components, the present invention can be used with other and different configurations which will be known to those skilled in the art. Thus, the present invention is limited only by the claims set forth below.

I claim:

1. An injection mold information transmitter apparatus, comprising:
   a) an injection mold;
   b) at least one sensor providing information from said injection mold;
   c) a thermally isolated enclosure;
   d) sensor input circuitry positioned within said thermally isolated enclosure and coupled to said injection mold sensor;
   e) an analog to digital signal converter located within said thermally isolated enclosure; and
   f) a controller located at a location remote from said thermally isolated enclosure, said controller arranged to receive digital signals from said converter based on the information from said sensors.

2. An injection mold transmitter apparatus as set forth in claim 1 wherein said apparatus further includes a wireless transmitter that communicates digital signals from said analog to digital signal converter to said controller.

3. An injection mold transmitter apparatus as set forth in claim 2 wherein said apparatus further includes a junction box which communicates with the apparatus for operating said injection mold and one or more of the components in said thermally isolated enclosure.

4. An injection mold transmitter apparatus as set forth in claim 2 wherein said apparatus further includes a sensor conditioning input circuit.

5. An injection mold transmitter apparatus as set forth in claim 2 wherein said apparatus further includes an isolation circuit.

6. An injection mold transmitter apparatus as set forth in claim 2 wherein said apparatus further includes a multiplexer.

7. An injection mold transmitter apparatus as set forth in claim 2 wherein said apparatus further includes an amplifier.

8. An injection mold transmitter apparatus as set forth in claim 2 wherein said apparatus further includes a microprocessor.

9. An injection mold transmitter apparatus as set forth in claim 2 wherein said apparatus further includes a transmitter in said thermally isolated enclosure and arranged to transmit a digital signal from said converter to said controller.

10. An injection mold transmitter apparatus as set forth in claim 2 wherein said apparatus further includes a power supply.

11. An injection mold transmitter apparatus as set forth in claim 2 wherein said apparatus further includes a sensor signal amplifier for low level analog signals.

12. An injection mold transmitter apparatus as set forth in claim 2 wherein said apparatus further includes a sensor conditioning input circuit, an isolation circuit which directly or indirectly communicates with said conditioning input circuit, a multiplexer which directly or indirectly communicates with said isolation circuit, an amplifier which directly or indirectly communicates with said multiplexer, said analog to digital converter which directly or indirectly communicates with said amplifier, a microprocessor which directly or indirectly communicates with said analog to digital converter, and a wireless transmitter which directly or indirectly communicates with said microprocessor.

13. A method of injection mold information transmission, comprising:

1) communicating data between an injection mold sensor and an analog to digital signal converter;
2) positioning said analog to digital signal converter within a thermally isolated enclosure;
3) communicating data between said analog to digital signal converter and said controller; and
4) positioning said controller at a location remote from said thermally isolated enclosure.

14. An injection mold transmitter apparatus, comprising:

1) means for generating at last one reporting signal;
2) at least one controlled device associated with the injection mold; and,
3) a signal processor arranged within a thermally isolated enclosure to process said reporting signals for use by a remotely located mold controller, said signal processor being connected to a first transmitter, and means to transmit said reporting signals to said remotely located controller.

15. An injection mold transmitter apparatus as set forth in claim 14 wherein said apparatus further includes means for the wireless transmission of a digital signal from said signal processor to said converter.

16. A method of injection mold control, comprising:

1) connecting a means for generating at least one reporting analog signal from a mold sensor;
2) means for converting said analog signal to digital form within a thermally isolated enclosure coupled to the injection mold; and
3) means for transmitting said digital signal to a remotely located mold control device.

17. An injection mold control system, comprising:

1) a mold sensor;
2) an analog signal generator coupled to said mold sensor that generates reporting signals in analog form;
3) a thermally isolated enclosure coupled to the injection mold within which is positioned a signal processor that converts said reporting signals to digital form; and
4) a transmitter to transmit said digital signals to a remotely located control device by wireless means.

* * * * *